United States Patent
Toussaint et al.

(10) Patent No.: US 9,129,255 B2
(45) Date of Patent: Sep. 8, 2015

(54) BUSINESS PROCESS MANAGEMENT (BPM) ADD-IN FOR OFFICE SOFTWARE

(75) Inventors: Alex Toussaint, San Francisco, CA (US); David P. Meyer, San Francisco, CA (US); Diego Sabaris, Capital Federal (AR); Eduardo Chiocconi, Dublin, CA (US); Eduardo Carlos Rubio, Capital Federal (AR); Emilio Lopez Gabeiras, Buenos Aires (AR); Hans Sussenburger, Oakland, CA (US); Pablo Alvarez, Buenos Aires (AR); Paulo Gustavo Veiga, Buenos Aires (AR); Jorge Aliss, Buenos Aires (AR); Guillermo Roldos, Buenos Aires (AR)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 738 days.

(21) Appl. No.: 12/467,647

(22) Filed: May 18, 2009

(65) Prior Publication Data

US 2010/0293503 A1    Nov. 18, 2010

(51) Int. Cl.
*G06Q 10/10* (2012.01)
*G06F 9/445* (2006.01)
*G06Q 10/06* (2012.01)

(52) U.S. Cl.
CPC .............. *G06Q 10/10* (2013.01); *G06Q 10/06* (2013.01); *G06F 9/44526* (2013.01); *G06Q 10/06315* (2013.01); *G06Q 10/103* (2013.01)

(58) Field of Classification Search
CPC .......... G06Q 10/103; G06Q 10/06315; G06F 9/44526; G06F 17/30082
USPC ........................................................... 709/204
See application file for complete search history.

(56) References Cited

U.S. PATENT DOCUMENTS

| | | | |
|---|---|---|---|
| 5,930,512 A * | 7/1999 | Boden et al. .................. 717/102 |
| 7,062,749 B2 | 6/2006 | Cyr et al. |
| 7,603,674 B2 | 10/2009 | Cyr et al. |
| 7,765,291 B1 * | 7/2010 | Khan et al. ..................... 709/224 |
| 2002/0078159 A1 * | 6/2002 | Petrogiannis et al. ........ 709/206 |
| 2003/0085245 A1 * | 5/2003 | Chiku .......................... 224/275 |
| 2004/0221261 A1 * | 11/2004 | Blevins .......................... 717/107 |
| 2006/0150156 A1 | 7/2006 | Cyr et al. |
| 2006/0202964 A1 * | 9/2006 | Liaw et al. ..................... 345/168 |
| 2007/0233535 A1 * | 10/2007 | Kim .................................. 705/7 |
| 2008/0082929 A1 * | 4/2008 | Stignani et al. ................ 715/764 |
| 2008/0133381 A1 * | 6/2008 | O'Brien et al. .................. 705/27 |
| 2008/0155518 A1 * | 6/2008 | Van Wyk et al. .............. 717/142 |
| 2009/0049025 A1 * | 2/2009 | Fay et al. .......................... 707/4 |
| 2009/0271439 A1 * | 10/2009 | Hack et al. .................. 707/104.1 |
| 2009/0271762 A1 * | 10/2009 | Taylor et al. .................. 717/107 |
| 2009/0281865 A1 * | 11/2009 | Stoitsev ............................ 705/9 |
| 2010/0070562 A1 * | 3/2010 | Boyer et al. .................. 709/203 |
| 2010/0153167 A1 * | 6/2010 | Kretzschmar et al. ............ 705/9 |

* cited by examiner

Primary Examiner — Tom Y Chang
(74) Attorney, Agent, or Firm — Tucker Ellis LLP (57) ABSTRACT

One embodiment of the present invention comprises a plug-in for an office software product. The plug-in can allow for the creation of a Business Process Management (BPM) instance that can be related to an open document in the office software product. The Business Process Management instance can be launched at a business process management server running business process management software. The business process management software can be separate from the office software product.

20 Claims, 5 Drawing Sheets

BUSINESS PROCESS MANAGEMENT (BPM) ADD-IN FOR OFFICE SOFTWARE

BACKGROUND

The present invention relates to Business Process Management (BPM) software. BMP software can be used to automate and track business processes. The business processes can include work done by users, as well as automated steps.

DETAILED DESCRIPTION

Figure 1:
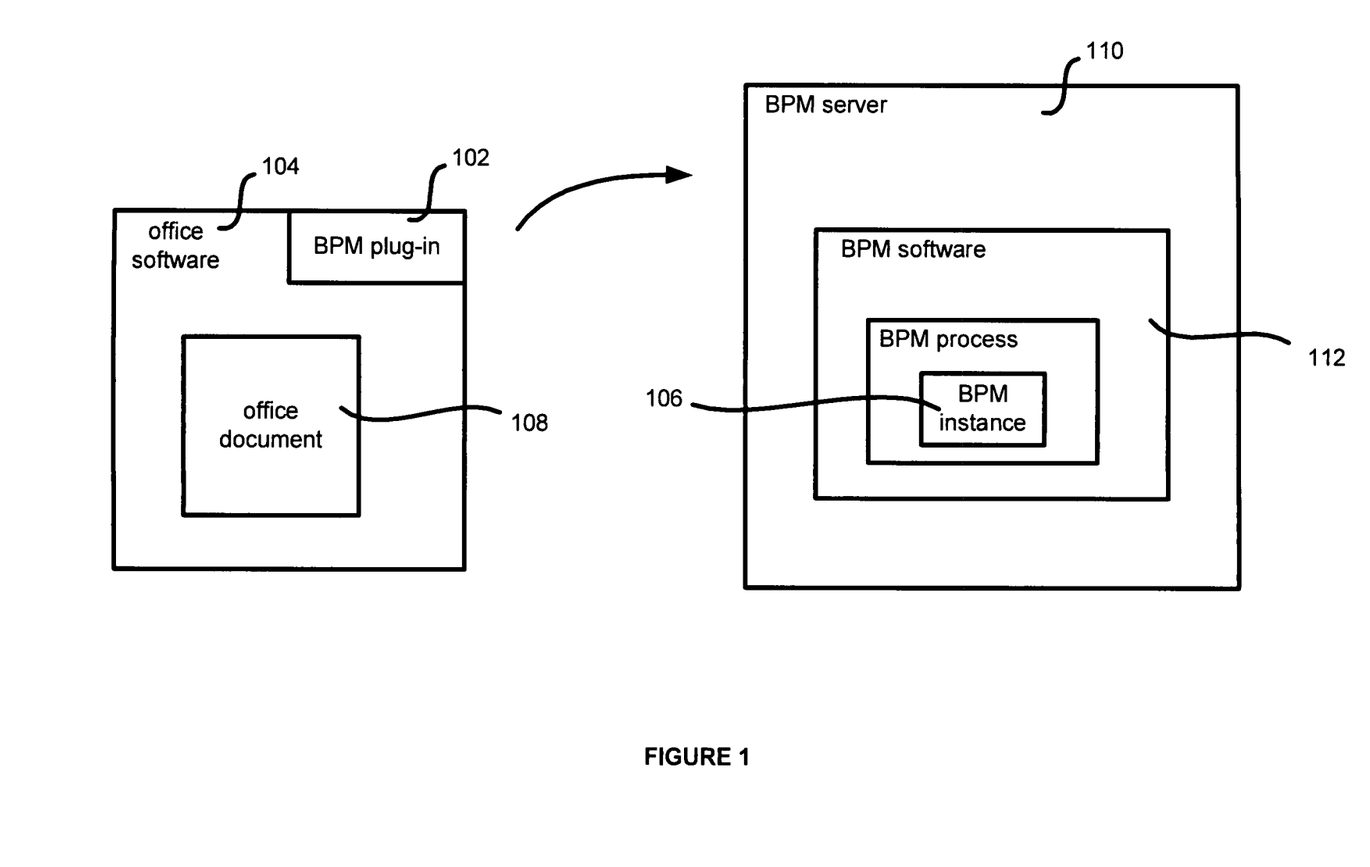
FIG. 1 shows a BPM plug-in system of one embodiment.

One embodiment of the present invention is a system 100. A plug-in 102 for an office software product 104 can allow for the creation of a business process management instance 106 related to an open document in the office software product 104. The business process management instance 106 can be launched at a business process management server running 110 business process management software 112. The business process management software 112 can be separate from the office software product 104.

The use of a BPM plug-in at office software can make it easier for a user to put the office documents into a BPM process. Rather than being required to leave the office software to attach the office document into a BPM process, the user can remain in the familiar office software environment, while sending the office document into the BPS process. This can improve user productivity.

The BPM plug-in can hook into APIs provided by the office software to provide displays and allow for actions using the BPM system. Exemplary plug-ins can be add-ins for Microsoft™ Office Software.

The office software product 104 can be a word processor program, a spread sheet program, an email program or any other such office software.

The plug-in 102 can allow the user to select the business process management server 110 from a display of available business process management servers.

The user of the plug-in 102 can select a type of action to be done at the business process server.

The available BPM servers and available possible actions shown by the plug-in to a user can depend on user credentials.

FIGS. 2A-2D shows a display 202 of office software with display elements provided by the BPM plug-in. In this example, the BPM tab 204 includes "submit to business process" element 204a, a "change settings" element 204b and a "view help" element 204c.

Figure 2A:
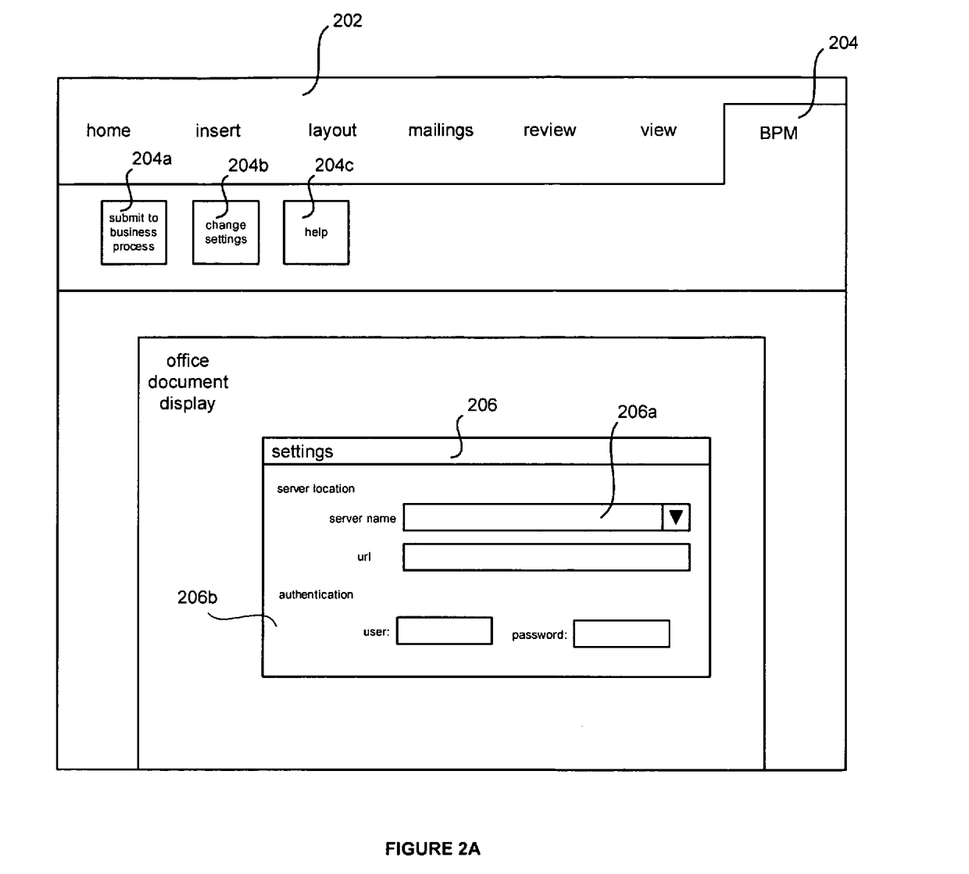
FIGS. 2A-2D shows examples of BPM plug-in displays in office software to send an office document into a business process.

FIG. 2A shows the selection of a BPM server using a "settings" display window 206. The settings display window 206 can allow for the selection of a BPM server using input area 206a. Input area 206a can also have a pull down list of available BPM servers.

Authentication can be done to the BPM server using authentication inputs like user name and password in area 206b.

Figure 2B:
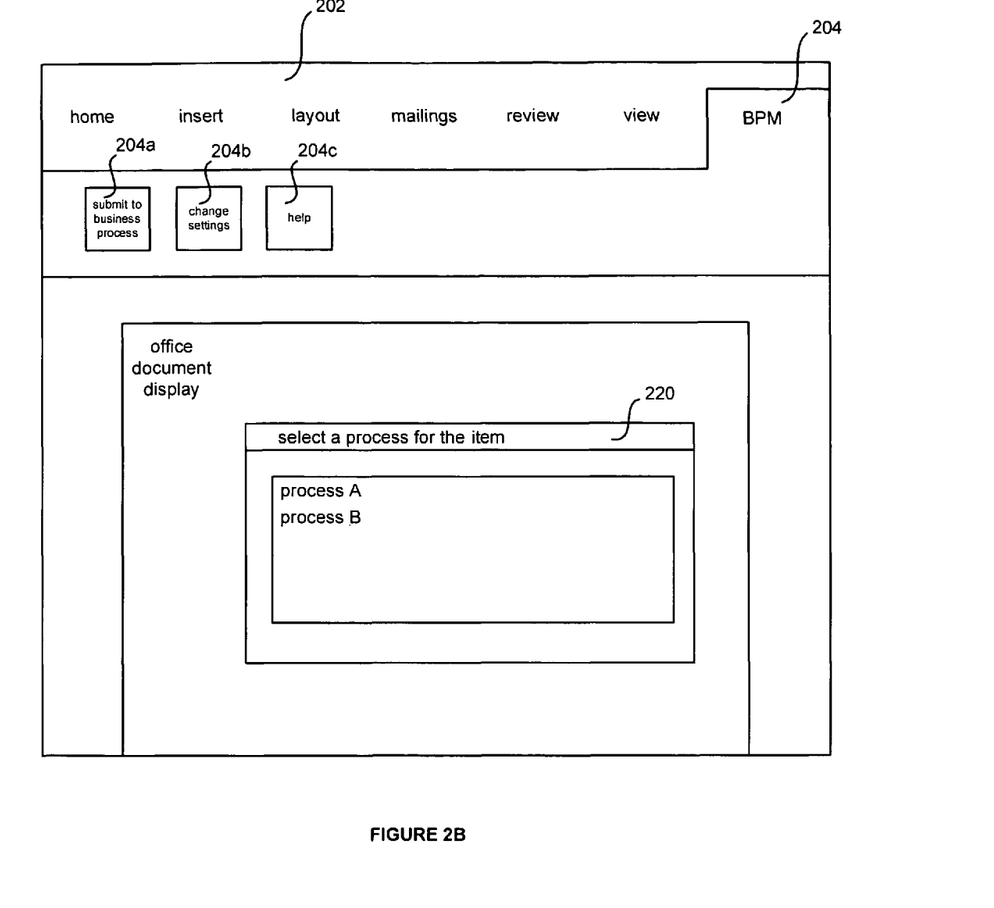

As shown in FIG. 2B, the clicking on the "submit to business process" element 204a can bring up a display 220 of the available business process for selection. The available business processes shown can be the business processes at the selected BPM server that are available given the user's credentials.

Figure 2C:
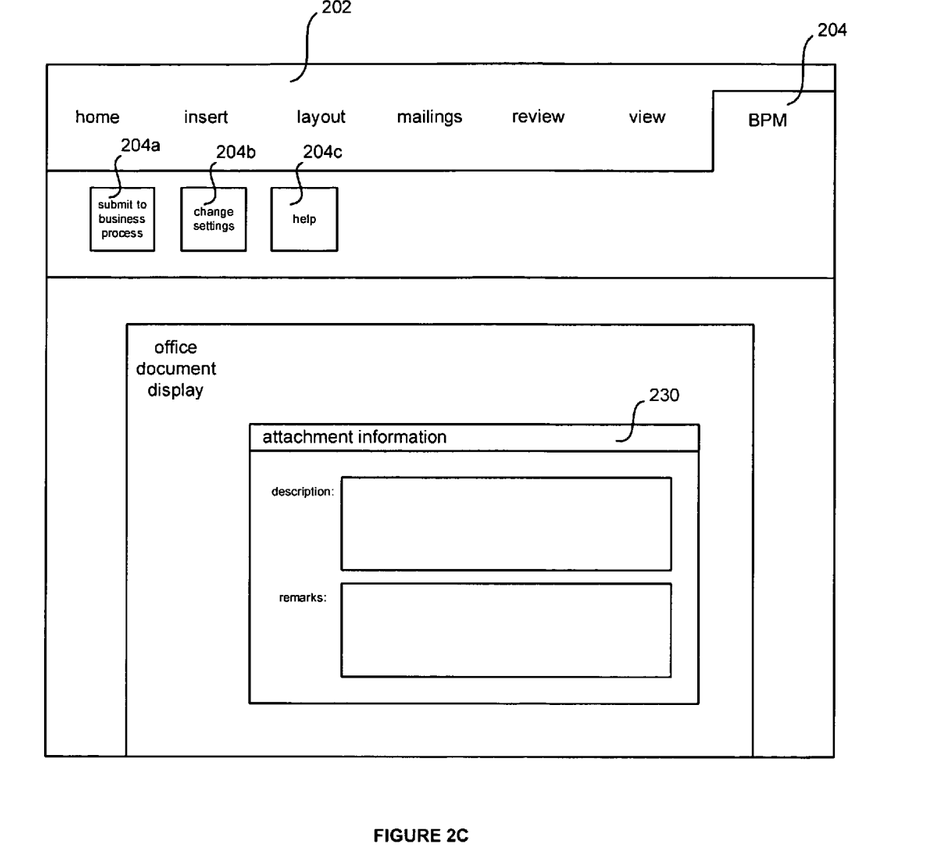

FIG. 2C shows a display 230 to allow attachment information such as a description and remarks to be associated with the office document sent to the BPM software.

Figure 2D:
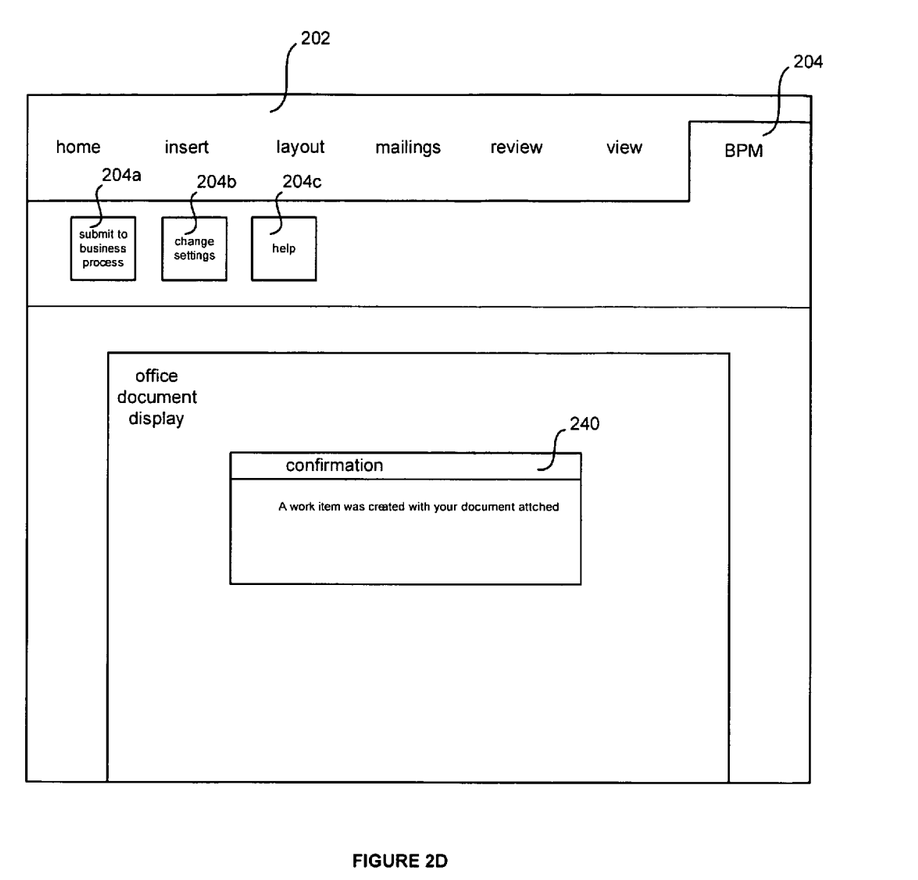

FIG. 2D shows a configuration display 240 that indicates that the office document was sent to the BPM software process at the BPM software as a BPM instance.

In various embodiments, the business process management (BPM) system mentioned above can be used to integrate a plurality of heterogeneous applications within an enterprise into a single graphically defined process. Once executed, this process can form a process instance which can call on the various applications in order to invoke their functionality. Furthermore, the BPM system can allow creation of new processes which can invoke the existing applications in order to reuse their functionality and prevent duplication of code.

In various embodiments, the BPM system can include a process designer component that can be used to graphically draw a definition of a business process. The process definition can be comprised of multiple activities linked by various transitions, all of which can be graphically represented in the process definition.

At a high level, a business process can be designed to represent a specific set of business tasks and activities which must be executed in an organization to reach a well-defined outcome. When this outcome is reached, the process is deemed to be complete. Examples of such processes can include hiring a new employee, processing a sales order, reimbursing a business expense and other more complex processes according to the particular needs of the organization. In some cases, it may not be possible to reach the main goal of the process. For example, the shipping clerk may have to cancel a sales order because the product is out of stock. Therefore, a business process allows different possible end conditions besides the principal objective of the process. It can allow more than one way to reach the main objective. For instance, if the product is out of stock it may be possible to offer an equivalent alternative. In turn, this offer may be accepted or rejected. A range of possibilities can thus be included in the process.

At a more functional level, the business process can be broken down into a set of logical steps called activities, each of which can comprise one or more tasks. As an illustration, an activity that notifies a client of an incomplete sales order may include the task of sending an electronic mail (email) message to the client. Each of these tasks and activities can be graphically represented in the business process definition. When activities are executed automatically by the system, they are referred to as automatic activities. When human input is required, they are referred to as interactive activities. As an illustration, the following are the types of activities that can be included in the BPM system:

a. Process Initiation/Termination Activities—These activities function as a beginning and end points for the process. The activities are automatically generated and define the scope of the process. Examples of this type of activity include Begin Activity and the End Activity.

b. Human Interaction Activities—Allows user interaction with process. Examples include Interactive Activity, Grab Activity and Decision Activity.

c. System Activities—Handle automatic interactions with business systems. Example is an Automatic Activity.

d. Organizational Interaction Activities—Allow communication with other areas and processes of an organization. Examples include Process Creation Activity, Termination Wait Activity, Process Notification Activity, Notification Wait Activity and Dynamic Process Call Activity.
  e. Process Control Activities—Control process flow or generate copies of a process instance to allow flow through multiple paths simultaneously. Examples include Split Activity, Split N Activity, Join Activity and Conditional Activity.
  f. Global Activities—Handle global requirements that are not associated with a specific process instance. Examples include Global Creation Activity and Global Automatic Activity.
  g. Miscellaneous Activities—Provide other functionality with a process. Examples include Connectors and Measurement Marks.

It should be noted that the above activities are provided purely for illustrational purposes and that the BPM system is not limited to this or any other specific list of activity types.

In various embodiments, the activities of the business process can be linked by transitions, which bridge the activities and determine the order in which the activities will be performed and the basic workflow for the process. In other words, the transition can determine which path the process will follow from any given activity. As an illustration, the BPM system can support the following transition types:
  a. Conditional Transition—the path of the transition is taken if an expression evaluates as true.
  b. Due Transition—the path is taken if the process instance remains in the activity longer than the specified time. In one embodiment, time can be specified directly, via expression, or by looking up an external metric.
  c. Error Transition—the path is taken if an error occurs.
  d. Compensate Transition—the path is taken when an activity or group of activities require that the actions performed by the BPM methods should be reversed.
  e. Unconditional Transition—the path is taken if all other transitions evaluate false.

It should be noted that these are intended to be non-limiting examples of transitions and other such transitions between activities are possible within the scope of the present embodiments.

In one embodiment, activities have at least an outgoing unconditional transition so there is always a way to continue the process. In most real-world processes several activities also have outgoing conditional transitions. In this case, the conditional transitions are evaluated first, and the unconditional transition is taken only if the conditional transitions all evaluate to false. In programming terms, the unconditional transition is like an else clause in an if-then-else construct. In one embodiment, the business rule transitions are evaluated before conditional transitions, so if a business rule transition and a conditional transition both evaluate to true, the business transition is used. Due transitions can act separately. They can pull the instance from the activity as soon as a time condition is met. In this case, all other outgoing transitions can be ignored.

In various embodiments, each activity of the business process can belong to a role. Roles can then be assigned to participants who are the actual individual users who interact with the process. A given participant can have one role or multiple roles. The participants who can perform an activity are those who have been assigned the role that the activity belongs to. In certain embodiments, the roles can be parametric, i.e. they can take on different values at execution of the process instance and depending on that value at execution time, the task can be assigned to a different person. For example, depending on the dollar amount of the credit request, the same activity of the process can be directed to a different approval manager according to that value. Similarly, depending on the value of the geographical region where the request originated, the activity/task may be forwarded to a different person. The parametric role thus allows one business process definition and one activity to be executed by different roles, depending on specific values which take place at runtime.

In various embodiments, the BPM system further includes an execution console that manages the execution of process instances by the engines, and a repository that maintains state data associated with each process instance (e.g. persistent variables and decisions of the process). Furthermore, the system can include an organizational settings module that populates the process with organization-specific values upon instantiation.

Business processes can thus be designed with the process designer and executed with a BPM execution engine, along with client applications, management tools, and other components, to interact with it. All of these modules can be included within the BPM system. Additionally, if a business process invokes web services, reads from a custom database, or uses Enterprise JavaBeans (EJBs), it may be necessary to ensure that these services are available in order to enable the application to work as expected.

In various embodiments, the BPM system can be used to integrate a set of multiple, heterogeneous applications (both backend and front end applications) into a single and seamless business process. New business processes can then be similarly created to invoke these existing applications. To achieve this, integration adapters can be generated using technology-specific discovery mechanisms. This approach enables integration with a wide range of common technologies, including but not limited to Java libraries, .NET assemblies, COM/DCOM components, Web Services, message queues, Enterprise Java Beans (EJBs), CORBA objects, relational databases and XML documents. In one embodiment, the BPM system introspects or discovers the metadata from any application programming interface (API) to identify the business service and its incumbent data, and then packages those elements as reusable components that are invoked from business processes when required. For example, when a business process instance is executed, one of its activities can invoke an application, while another activity can invoke a completely different application, one that is remotely located and built on a different technology platform from the first application.

When a business process is executed by an engine, it can form a specific process instance. A business process instance is a specific item proceeding through the business process. Thus, the process instance can be the representation of a single enactment of a process, or an activity within a process, including its associated data. For example, in a business process which handles purchases, each instance will be an individual purchase order. There can be any number of instances traversing a business process, as there can be any number of purchase orders going through a purchase order system. In one embodiment, each instance can represent a separate thread of execution of the process or activity, and will have its own internal state and externally visible identity, which may be used, for example, to record or retrieve audit data relating to the individual enactment, such as a particular purchase order number, as opposed to the general purchase order process. Instances can start at the Begin activity of the process and finish in the End activity. The path the instances take can depend entirely on the data of the instance and the external environment.

Each process instance can have a specific history and properties. In the case of a purchase order, the instance can contain a customer name, a list of items, an amount due, dates of delivery and payment, and other relevant data. An instance can also have various status conditions. In the case of a purchase order, it may be desirable to know if it has been approved, if it has been paid for, or if the requested products have been shipped. The process instance can also utilize different backend applications within the enterprise via the introspection discovery mechanism previously described. Thus, each activity of the instance can invoke a different application within the enterprise.

Each instance can have a beginning and an end, as defined in the business process. As the instance proceeds through the process, it can be worked on by various participants or processed automatically by software. Thus, when the process instance is executed, activities and tasks are accessed by the various participants within the organization.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A method comprising:

providing process management software on a plurality of server computers, said process management software used to integrate a plurality of applications, wherein said process management software is used to graphically construct a plurality of process definitions using a graphical user interface (GUI), said plurality of process definitions defining a plurality of business processes each including one or more activities linked by a set of transitions and used to create at least one process instance that invokes said applications based on said process definition;

providing a plug-in for an office software product used to create documents, wherein the plug-in hooks into an application programming interface (API) of said office software product;

invoking said plug-in in said office software product in response to user input in said office software product;

providing a plug-in user interface in said office software product in response to invoking said plug-in;

receiving user input via said plug-in user interface indicating a selection of a particular server computer from among said plurality of server computers;

receiving user input via said plug-in user interface indicating a selection of a particular business process from said plurality of business processes to be performed by said process management software on said particular server computer;

in response to receiving with said plug-in in said office software product the selection of said particular server computer and said particular business process to be performed, creating in said process management software on said particular server computer a new process instance of said particular business process and related to an open document in the office software product;

sending said open document as an attachment to the new process instance from within the office software product to the process management software on the particular server computer; and wherein the office software product is located on a separate computer from said particular server computer.

2. The method of claim 1, wherein the office software product is a word processor program.

3. The method of claim 1, wherein the office software product is a spread sheet program.

4. The method of claim 1, wherein the office software product is an Email program.

5. The method of claim 1, further comprising:
receiving user input, via said plug-in user interface, providing authentication information for said particular server computer.

6. The method of claim 1, further comprising:
receiving user input, via said plug-in user interface, providing remarks to be associated with said open document and transmitted to said particular server computer.

7. The method of claim 1, wherein the plurality of server computers and the plurality of business processes made available by the plug-in for selection by the user depends on at least one credential of the user.

8. A non-transitory computer readable storage medium comprising a set of instructions stored thereon, which instructions, when executed by a computer system cause the computer system to perform steps comprising:
providing process management software on a plurality of server computers, said process management software used to integrate a plurality of applications, wherein said process management software is used to graphically construct a plurality of process definitions using a graphical user interface (GUI), said plurality of process definitions defining a plurality of business processes each including one or more activities linked by a set of transitions and used to create at least one process instance that invokes said applications based on said process definition;
providing a plug-in for an office software product used to create documents, wherein the plug-in hooks into an application programming interface (API) of said office software product;
invoking said plug-in in said office software product in response to user input in said office software product;
providing a plug-in user interface in said office software product in response to invoking said plug-in;
receiving user input via said plug-in user interface indicating a selection of a particular server computer from among said plurality of server computers;
receiving user input via said plug-in user interface indicating a selection of a particular business process from said plurality of business processes to be performed by said process management software on said particular server computer;
in response to receiving with said plug-in in said office software product the selection of said particular server computer and said particular business process to be performed, creating in said process management software on said particular server computer a new process instance of said particular business process and related to an open document in the office software product;
sending said open document as an attachment to the new process instance from within the office software product to the process management software on the particular server computer; and
wherein the office software product is located on a separate computer from said particular server computer.

9. The non-transitory computer readable storage medium of claim 8, wherein the office software product is a word processor program.

10. The non-transitory computer readable storage medium of claim 8, wherein the office software product is a spread sheet program.

11. The non-transitory computer readable storage medium of claim 8, wherein the office software product is an email program.

12. The non-transitory computer readable storage medium of claim 8, wherein said steps further comprise:
receiving user input, via said plug-in user interface, providing authentication information for said particular server computer.

13. The non-transitory computer readable storage medium of claim 8, wherein said steps further comprise:
receiving user input, via said plug-in user interface, providing remarks to be associated with said open document and transmitted to said particular server computer.

14. The non-transitory computer readable storage medium of claim 8, wherein: the plurality of server computers and the plurality of business processes made available by the plug in for selection by the user depends on at least one credential of the user.

15. A system comprising:
a plug-in for an office software product used to create documents, wherein the plug-in hooks into an application programming interface (API) of said office software product;
process management software operating on a plurality of server computers each comprising one or more microprocessors, wherein the process management software is located on a separate server computer from the office software product;
wherein said process management software is used to integrate a plurality of applications, wherein said server computer is used to graphically construct a plurality of process definitions using a graphical user interface (GUI), said plurality of process definitions defining a plurality of business processes each including one or more activities linked by a set of transitions;
wherein said plug-in is configured to enable,
invoking said plug-in in said office software product in response to user input in said office software product,
providing a plug-in user interface in said office software product in response to invoking said plug-in,
receiving user input via said plug-in user interface indicating a selection of a particular server computer from among said plurality of server computers,
receiving user input via said plug-in user interface indicating a selection of a particular business process from said plurality of business processes to be performed by said process management software on said particular server computer,
in response to receiving with said plug-in in said office software product the selection of an action said particular server computer and said particular business process to be performed, creating in said process management software on said particular server computer a new process instance of said particular business process and related to an open document in the office software product, and
sending said open document as an attachment to the new process instance from within the office software product to the process management software on the particular server computer.

16. The system of claim 15, wherein the office software product is a word processor program.

17. The system of claim 15, wherein the office software product is a spread sheet program.

18. The system of claim 15, wherein the office software product is an email program.

19. The system of claim 15, wherein the plug-in is configured to enable receiving user input, via said plug-in user interface, providing authentication information for said particular server computer.

20. The system of claim 15, wherein the plug-in is configured to enable receiving user input, via said plug-in user interface, providing remarks to be associated with said open document and transmitted to said particular server computer.

\* \* \* \* \*

UNITED STATES PATENT AND TRADEMARK OFFICE
CERTIFICATE OF CORRECTION

| | |
|---|---|
| PATENT NO. | : 9,129,255 B2 |
| APPLICATION NO. | : 12/467647 |
| DATED | : September 8, 2015 |
| INVENTOR(S) | : Toussaint et al. |

Page 1 of 1

It is certified that error appears in the above-identified patent and that said Letters Patent is hereby corrected as shown below:

In the claims

Column 6, line 67, claim 4, delete "Email" and insert -- email --, therefor.

Column 8, line 11, claim 14, delete "plug in" and insert -- plug-in --, therefor.

Column 8, line 45, claim 15, delete "of an action" and insert -- of --, therefor.

Signed and Sealed this
Thirty-first Day of May, 2016

Michelle K. Lee
*Director of the United States Patent and Trademark Office*